C. O. ROBINSON, DEC'D.
E. S. ROBINSON, ADMINISTRATRIX.
METHOD OF STERILIZING OR PASTEURIZING MILK IN BOTTLES.
APPLICATION FILED FEB. 27, 1914.
1,195,091.
Patented Aug. 15, 1916.
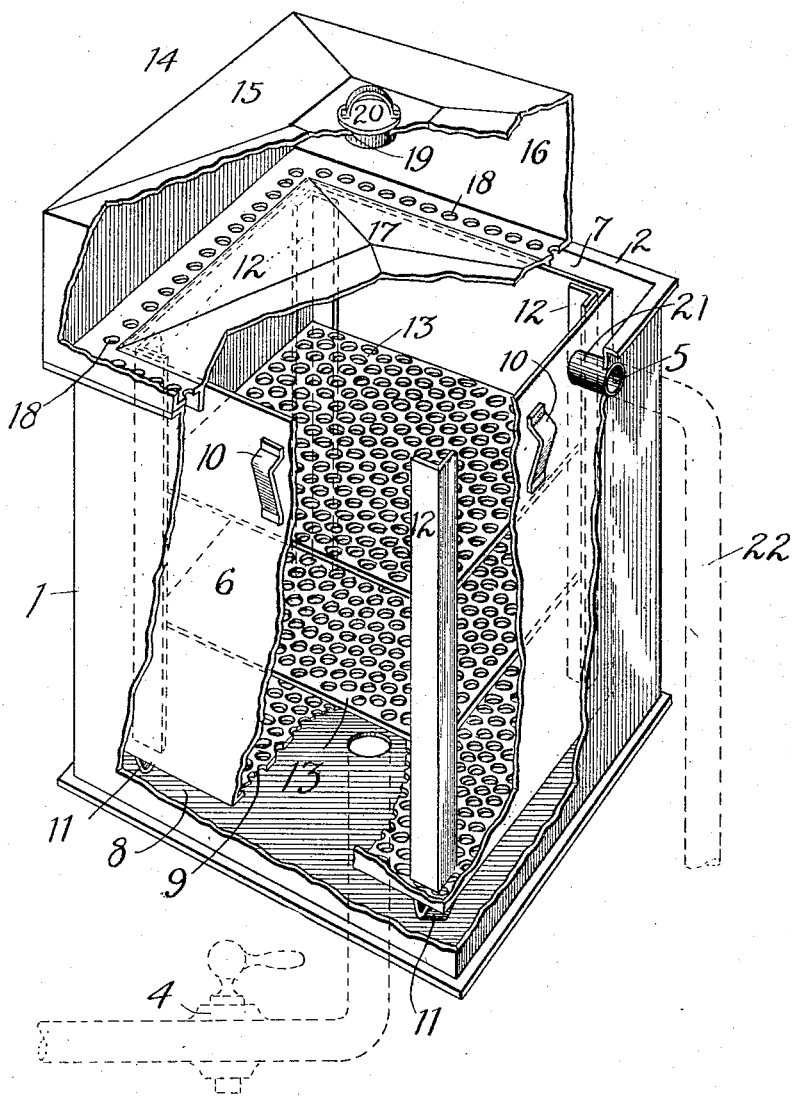

UNITED STATES PATENT OFFICE.

CHARLES O. ROBINSON, OF FREDERICK, MARYLAND; EFFIE S. ROBINSON ADMINISTRATRIX OF SAID CHARLES O. ROBINSON, DECEASED.

METHOD OF STERILIZING OR PASTEURIZING MILK IN BOTTLES.

1,195,091. Specification of Letters Patent. Patented Aug. 15, 1916.

Original application filed November 22, 1913, Serial No. 802,467. Divided and this application filed February 27, 1914. Serial No. 821,502.

*To all whom it may concern:*

Be it known that I, CHARLES O. ROBINSON, a citizen of the United States, and residing at Frederick, county of Frederick, State of Maryland, have invented certain new and useful Improvements in Methods of Sterilizing or Pasteurizing Milk in Bottles, of which the following is a specification, reference being had therein to the accompanying drawing.

My invention relates to the art of sterilizing and especially pasteurizing, and has for its object the production of an improved method of treating milk and other substances by the application of heat, so as to render them either partially or wholly sterilized and otherwise more perfectly adapt them to the uses for which they are intended.

In the specific form herein presented, my invention has to do with the pasteurizing of milk in bottles or other dispensing vessels, the net result of the process being to deliver the milk (or other substance which may be treated) to the consumer in the same condition in which it leaves the laboratory. Obviously this desideratum is unattainable by any method which involves subdividing or rehandling the milk or other substance after it has been treated. Even exposure to the air may result in changes, which by my process are all avoided. Heretofore, in sterilizing or pasteurizing substances in glass vessels, a certain amount of breakage and loss has appeared to be unavoidable by reason of the lack of control of the temperature changes. Such breakage and loss are avoided by my method, which only permits gradual changes, and which supplies the heat to and removes it from the objects being treated in a uniform and gradual manner.

In order to attain my object, I immerse the bottles of milk or other objects to be treated in fluid, applying heat to bring the temperature of the fluid up to the desired degree, hold it at that point for a predetermined length of time, and then remove the source of heat and introduce a cooling fluid in such a manner that it gradually replaces the heated fluid and reduces the temperature of the bottles or other objects without producing a sudden change or chill at any point. More specifically stated, heat is imparted to the fluid preferably from the bottom, and by convection and conduction gradually pervades the entire fluid with the immersed objects, up to the top, in a natural manner. In cooling, since the object is to absorb heat and carry it off, the cooling fluid is introduced from the top, and around the outside of the body of heated fluid, so that in sinking according to the natural law, it absorbs a certain amount of heat, and reaching the bottom of the body of fluid, is ready to naturally circulate again in an upward direction, to be drawn off from the middle of the body at the top. Thus a natural and very gradual flow of heat currents is always maintained, whether during a rising or a falling temperature.

In this application, I shall present my process specifically as applied to pasteurizing milk in bottles. It is to be understood that the invention is not so limited but may be practised with other substances and with other fluids than water and with any containing vessel, whether it be glass, earthen ware, metal, coated paper, or the like. Any material which will stand the required temperature can be used without detriment.

This application is a division of my prior application filed November 22, 1913, Serial No. 802,467.

One form of apparatus with which my invention may be practised is illustrated in the accompanying drawing, which shows the same in perspective, with parts broken away to show the interior construction thereof.

I shall first describe the apparatus, and then point out how my method is to be practised therewith.

In the drawing 1 designates the outer container which in this case is a rectangular vessel of copper tinned inside, having a flanged upper edge 2 and a drain pipe 3 leading from the bottom and fitted with a suitable cock 4. An opening 5 is provided in the upper part of one side wall to receive an overflow pipe which will be presently described. Inside the outer container 1 is an inner container 6 of similar shape, but having its dimensions less in all directions, so that a space 7 will be left between the side walls of the inner and outer containers, extending all around between the same, and a similar space 8 beneath the bottom of the inner container. This bottom 9 of the inner container is reticulated or perforated, but the side walls are solid, so that circulation can only take place through the bottom. In order to maintain uniformity of spacing between the inner and outer containers I provide distance pieces or projections, marked 10 and feet 11 preferably on the inner container.

Fitted within the container is a rack composed of four upright angle pieces 12, carrying between them rectangular reticulated or perforated platforms or shelves 13. The rack is readily slid into and out of the inner container, and may be provided with any suitable or desired form of means for handling it.

Overlying and covering both containers is a hollow cover 14, having side walls 16, a top 15 and a bottom 17 with a series of perforations 18 extending all around the edges of the bottom 17 and when the cover is in position, opening communication between the chamber within said cover and the space 7 between the side walls of the inner and outer containers. The top of the cover is provided with a central opening 19 fitted with a plug 20 for the introduction of cooling water.

The inner container is provided with a short drainage pipe or nipple 21 near the top of one of its side walls, and directly opposite this, so as to register therewith when the parts are in position, is the opening 5 in the side wall of the outer container. A suitable overflow pipe 22 is connected to the nipple 21 through the opening 5 during operation.

According to my method, in pasteurizing milk with the foregoing or some other apparatus, I first immerse the bottles of milk in water, then heat the water by any suitable means until it reaches the temperature of 140°, and maintain this temperature from 20 to 30 minutes. By immersing the bottle while the water is cool, a uniform temperature is maintained in the water and in the milk, which rises gradually to the maximum temperature, so that the milk is actually maintained at the pasteurizing temperature for the full period required to obtain the best result. After this is done, the milk being perfectly sterilized, I introduce cold water in such a way that it will circulate around the bottles, and rise beneath them, mingling with the then hot water by which they are surrounded and gradually replacing the same from the bottom up. This circulation, produced only by the natural convection currents themselves, effects a very gradual and perfectly uniform reduction of the temperature of the bottles and of the milk therein, accompanied by a gradual drainage of the warm water, for which means must be provided above the bottles, until a uniform minimum temperature is reached approximating that of the cold water constantly supplied. In practising this method with the apparatus previously described the following steps are performed: first the rack 12—13 is removed and filled with bottles, some of which may also be placed upon the perforated bottom of the inner container if desired. I prefer, however, to support the bottles upon the rack alone, so that they can all be removed after treatment by simply taking out the rack, which can then be reloaded and immediately replaced, or may be replaced without delay by a duplicate rack which has previously been loaded ready for the change. The latter mode of operating of course renders it possible to keep the sterilizer in constant operation without any loss of time.

The loaded rack having been dropped into the inner container, the cover 14 is placed in position with its flanged edge fitting around the edge of the outer container and resting upon the upper flange 2 thereof, and its bottom 17, which is slightly domed or coned or otherwise raised, overlying the inner container. The containers are then filled with cool water which may be by means of the pipe 3, or any other suitable means of supplying before or after the cover is put on. Heat is then applied to raise the temperature of the water. The simplest way to do this is by means of a flame or burners positioned beneath the bottom of the outer container. It should be understood that suitable heating means may be employed, whether coal, gas, electric or steam, all of which are well known in the art and need no description. The application of heat continues until the temperature of all the contents of the outer container, is raised to 140°, which may be determined by a gage or thermometer, also not shown. This temperature is maintained for the required period of 20 to 30 minutes, and then the supply of heat is cut off, and cold water is introduced into the top 14 through the opening 19, from which the plug 20 is removed for that purpose. This cold water flows into the top, down over the inclined surfaces of the bottom 17, and through the openings 18 into the chamber or space 7 between the inner and outer containers. As the level of the water in this space is thus raised above the level of the drainage pipe or nipple 21, the top layer of hot water in the inner container is correspondingly raised and flows out through the nipple 21 and the overflow pipe 22. At the same time, the cold water has a tendency to sink down and by convection gradually cool the heated water in the chamber or space 7, and also to absorb a certain amount of the heat from the inner container by conduction through the solid side walls thereof. Thus, there is a gradual abstraction of heat, and drainage of hot water from the top, until the cooled water has fallen below the bottom of the inner container when it will commence to rise through the perforated bottom 9, and gradually, both as regards its temperature and as regards its flow, to replace the hot water constantly raising the latter and causing it to drain off through the nipple 21 and pipe 22. At the end of a few minutes the process is complete, because the temperature of the bottles and their contents falls gradually with the temperature of the water surrounding them, and the heat passes off as it should, gradually from bottom to top of every object. After the desired minimum temperature is reached, the inflow of cold water is stopped, the cover 14 is removed and the rack 12—13 slid out and replaced with a fresh charge of bottles.

It will be obvious that my method may be practised with various forms of apparatus, but the apparatus disclosed herein is especially adapted for this method. It is to be understood, moreover, that changes may be made in many details of the apparatus, and even in some of the structural features, without departing from the spirit of the invention. For example, I may use the opening in the top of the cover, or a pipe inserted into the upper part of the space 7 between the inner and outer containers, for introducing hot as well as cold water. In other words, I may first fill the machine with cold water, and then cause hot water to pass down through the space 7 and up through the bottom 9 of the inner container and out through the pipe 22, thereby gradually heating the bottles, as the cold water drains off from the top. I may also introduce hot water through the pipe 22, and cause it to pass down through the inner container, and then drain off, or I may otherwise vary the use of this apparatus. The principal and essential feature of the invention is the gradual raising of temperature by convection or conduction or both, and the gradual reduction of the same by circulation, convection, and conduction in the general manner described.

Having thus described my invention what I claim is:

The method of pasteurizing milk and similar substances which comprises the following steps: (a) placing the milk in a container which will conduct heat; (b) immersing the container in a relatively cool fluid, surrounded by a separate concentric outer body of fluid communicating with the first body at the bottom only; (c) applying heat to the first body of fluid beneath the container so as to set up a gradual rising current of warm fluid until a temperature is reached sufficiently high to secure pasteurization; (d) maintaining said temperature in the liquid bodies for a predetermined time; (e) cutting off the supply of heat and producing a gradual flow of relatively cool fluid into the outer concentric body of heated fluid; and (f) draining off the surplus heated fluid from the top of the inner body, whereby the cooling fluid introduced is gradually heated as it descends into the outer concentric body, until it has abstracted sufficient heat therefrom to produce a gradual effect in the inner body, said cooling effect continuing with perfect uniformity throughout the inner body of fluid, until the lowest desired temperature is reached.

In testimony whereof I affix my signature in presence of two witnesses.

CHARLES O. ROBINSON.

Witnesses:
 WALTER D. MEHRLING,
 ALBERT S. BROWN.

Copies of this patent may be obtained for five cents each, by addressing the "Commissioner of Patents, Washington, D. C."